United States Patent
Khatri et al.

(10) Patent No.: US 10,853,474 B2
(45) Date of Patent: Dec. 1, 2020

(54) SYSTEM SHIPMENT LOCK

(71) Applicant: DELL PRODUCTS, L.P., Round Rock, TX (US)

(72) Inventors: Mukund P. Khatri, Austin, TX (US); Alaric J. N. Silveira, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 186 days.

(21) Appl. No.: 15/664,055

(22) Filed: Jul. 31, 2017

(65) Prior Publication Data
US 2019/0034620 A1    Jan. 31, 2019

(51) Int. Cl.
| | |
|---|---|
| G06F 21/45 | (2013.01) |
| G06F 21/57 | (2013.01) |
| H04L 9/32 | (2006.01) |
| H04L 29/06 | (2006.01) |
| G06F 9/4401 | (2018.01) |

(52) U.S. Cl.
CPC ............ G06F 21/45 (2013.01); G06F 21/575 (2013.01); H04L 9/3226 (2013.01); H04L 63/083 (2013.01); G06F 9/4401 (2013.01)

(58) Field of Classification Search
CPC ...... G06F 21/45; G06F 21/575; G06F 9/4401; H04L 9/3226
USPC ......................................................... 726/19
See application file for complete search history.

(56) References Cited

U.S. PATENT DOCUMENTS

| | | | | |
|---|---|---|---|---|
| 4,723,121 A | * | 2/1988 | van den Boom | G07C 9/00182 235/382 |
| 5,623,637 A | * | 4/1997 | Jones | G06F 12/1466 710/13 |
| 5,892,906 A | * | 4/1999 | Chou | G06F 21/31 713/2 |
| 6,223,284 B1 | * | 4/2001 | Novoa | G06F 21/572 709/216 |
| 6,731,536 B1 | * | 5/2004 | McClain | G11C 7/24 365/185.04 |
| 6,785,901 B1 | * | 8/2004 | Horiwitz | H04N 7/163 348/E7.061 |
| 7,092,908 B2 | | 8/2006 | Schull | |
| 7,945,792 B2 | | 5/2011 | Cherpantier | |
| 8,499,141 B2 | | 7/2013 | Swanson et al. | |
| 8,726,042 B2 | | 5/2014 | Lange et al. | |
| 8,949,813 B2 | | 2/2015 | Wilks et al. | |
| 9,104,886 B1 | * | 8/2015 | Dolbakian | G06F 21/62 |

(Continued)

*Primary Examiner* — Tae K Kim
*Assistant Examiner* — Peiliang Pan
(74) *Attorney, Agent, or Firm* — Isidore PLLC (57) ABSTRACT

A controller of an information handling system (IHS) prevents unauthorized access to an information handling system (IHS). The controller determines whether a lock data structure in a persistent memory device indicates one or more resources of the IHS are in a locked state. If in locked state, the controller: (i) disables a processor subsystem of the IHS from performing a start-up procedure until a unique password is received from a user interface coupled to the IHS; (ii) receives an input; (iii) determines whether the input matches a unique password contained in an externally unreadable portion of memory of the IHS; (iv) in response to the input matching the unique password, permanently changes the lock data structure to an unlocked state and enables the processor subsystem to perform the start-up procedure.

20 Claims, 4 Drawing Sheets

(56) References Cited

U.S. PATENT DOCUMENTS

| | | | | |
|---|---|---|---|---|
| 9,185,536 B1* | 11/2015 | Johnson | | H04W 4/16 |
| 9,332,002 B1* | 5/2016 | Bowen | | H04L 63/0823 |
| 10,339,293 B2* | 7/2019 | Yang | | |
| 2001/0025883 A1* | 10/2001 | Ichihara | | G07F 17/12 |
| | | | | 235/381 |
| 2003/0070099 A1* | 4/2003 | Schwartz | | G06F 21/31 |
| | | | | 726/5 |
| 2005/0044404 A1* | 2/2005 | Bhansali | | G06F 21/572 |
| | | | | 726/26 |
| 2005/0177769 A1* | 8/2005 | Stephen-Daly | | G06F 21/88 |
| | | | | 714/14 |
| 2006/0107073 A1* | 5/2006 | Lane | | E05B 73/0005 |
| | | | | 713/194 |
| 2006/0186988 A1* | 8/2006 | Proefke | | B60R 25/24 |
| | | | | 340/5.61 |
| 2007/0132553 A1* | 6/2007 | Nakashima | | B60R 25/24 |
| | | | | 340/5.72 |
| 2009/0064055 A1* | 3/2009 | Chaudhri | | G06F 3/04817 |
| | | | | 715/863 |
| 2009/0235333 A1* | 9/2009 | Ong | | G06F 21/85 |
| | | | | 726/4 |
| 2010/0100972 A1* | 4/2010 | Lemieux | | G06F 21/57 |
| | | | | 726/34 |
| 2010/0239090 A1* | 9/2010 | Oran | | H04N 21/63345 |
| | | | | 380/211 |
| 2011/0154023 A1* | 6/2011 | Smith | | G06F 21/78 |
| | | | | 713/155 |
| 2013/0081434 A1* | 4/2013 | Grant | | E05B 47/026 |
| | | | | 70/1.5 |
| 2013/0214157 A1* | 8/2013 | Kitano | | A61B 6/4283 |
| | | | | 250/336.1 |
| 2013/0218594 A1* | 8/2013 | Skocic | | G06Q 10/10 |
| | | | | 705/3 |
| 2013/0226795 A1* | 8/2013 | Hopper | | B60R 25/09 |
| | | | | 705/44 |
| 2014/0025973 A1* | 1/2014 | Schillings | | H04Q 9/00 |
| | | | | 713/323 |
| 2014/0047537 A1* | 2/2014 | McCann | | G06F 21/30 |
| | | | | 726/19 |
| 2014/0099923 A1* | 4/2014 | Kalderen | | H04W 12/12 |
| | | | | 455/411 |
| 2014/0292515 A1* | 10/2014 | Fawcett | | G08B 13/1445 |
| | | | | 340/572.1 |
| 2016/0004867 A1 | 1/2016 | Gillespie et al. | | |
| 2016/0048705 A1* | 2/2016 | Yang | | G06F 21/35 |
| | | | | 726/34 |
| 2016/0065725 A1* | 3/2016 | Meads | | H04W 4/029 |
| | | | | 455/411 |
| 2016/0099886 A1 | 4/2016 | Rao et al. | | |
| 2016/0227411 A1* | 8/2016 | Lundblade | | H04W 12/08 |
| 2016/0316367 A1* | 10/2016 | Rose | | H04L 9/3273 |
| 2017/0124358 A1* | 5/2017 | Krithivas | | G06F 21/44 |
| 2017/0230179 A1* | 8/2017 | Mannan | | G06F 21/602 |
| 2017/0244698 A1* | 8/2017 | Gale | | H04L 63/0853 |
| 2017/0289129 A1* | 10/2017 | Ghetie | | H04L 63/083 |
| 2019/0087610 A1* | 3/2019 | Krithivas | | G06F 21/44 |

* cited by examiner

SYSTEM SHIPMENT LOCK

BACKGROUND

1. Technical Field

The present disclosure relates in general to information handling systems (IHSs), and more particularly to a method and system for preventing tampering with IHS s.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many consumers of information handling resources are increasingly demanding that manufacturers of IHS(s) provide assurances that an information handling system ordered from the manufacturer has not been tampered with during or after delivery, prior to receipt by the customer. For example, without security measures in place, an interloper could possibly intercept an IHS during transit. Examples of such interlopers can include a government intelligence agency, a business competitor, or other person with harmful intent. Hardware and software components of the IHS could then be replaced with malicious components intended to mimic the replaced components while performing some malicious operation. Functionality of the IHS or data integrity can compromised. Furthermore, even if an IHS is delivered to an intended end user without tampering, such tampering may also occur at the destination before formal acceptance of the IHS by the end user. For example, a rogue employee, an individual gaining unauthorized access, or other person with harmful intent can gain access to a receiving area and from there access and tamper with the IHS. While the use of Trusted Platform Module (TPM) and other approaches have been employed to ensure security of software during transit of the IHS from the manufacturer to the intended end user, the industry still lacks an effective approach for providing such security with respect to hardware components and firmware residing on the hardware components.

BRIEF SUMMARY

In accordance with the teachings of the present disclosure, a method is provided of preventing unauthorized third-party access to an information handling system (IHS). In particular, the method provides for end user activation of an IHS that is locked for shipment. In one or more embodiments, the method includes determining whether a lock data structure in a persistent memory device indicates one or more resources of an IHS is in a locked state to prevent unauthorized activation. In response to determining that the lock data structure indicates the resources are in the locked state, a controller disables a processor subsystem of the IHS from performing a start-up procedure until a unique password is received. In response to receiving an input, the controller determines whether the input matches a unique password contained in an externally unreadable portion of memory of the IHS. In response to determining that the input matches the unique password, the method includes: (i) permanently changing the lock data structure to an unlocked state; and (ii) enabling the processor subsystem to perform the start-up procedure.

According to illustrative embodiments of the present disclosure, a controller of an IHS includes a system management interface in communication with a user interface, a persistent memory, and a processor subsystem in communication with the persistent memory device to execute a system shipment lock (SSL) utility. The SSL utility determines whether a lock data structure in the persistent memory indicates one or more resources of an IHS are in a locked state. In response to determining that the lock data structure indicates the locked state, the SSL utility disables the processor subsystem of the IHS from performing a start-up procedure until a unique password is received from the user interface. In response to receiving an input, the SSL utility determines whether the input matches a unique password contained in an externally unreadable portion of memory of the IHS. In response to determining that the input matches the unique password, the SSL utility: (i) permanently changes the lock data structure to an unlocked state; and (ii) enables the processor subsystem to perform the start-up procedure.

In accordance with embodiments of the present disclosure, an IHS includes one of more locally-available information handling resources, a system management interface in communication with a user interface, a persistent memory, and a processor subsystem in communication with the persistent memory device to execute a SSL utility. The SSL utility determines whether a lock data structure in the persistent memory indicates one or more resources of an IHS are in a locked state. In response to determining that the lock data structure indicates the locked state, the SSL utility disables the processor subsystem of the IHS from performing a start-up procedure until a unique password is received from the user interface. In response to receiving an input from the user interface, the SSL utility determines whether the input matches a unique password contained in an externally unreadable portion of memory of the IHS. In response to determining that the input matches the unique password, the SSL utility: (i) permanently changes the lock data structure to an unlocked state; and (ii) enables the processor subsystem to perform the start-up procedure.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to the described embodiments, a controller of an information handling system (IHS) prevents unauthorized access to the information handling system (IHS). The IHS is locked for shipping from one party to another, such as from an original equipment manufacturer (OEM) to a customer. The system shipping lock assures the customer that no one has activated the IHS since the IHS was shipped. The controller determines whether a lock data structure in a persistent memory device indicates one or more resources of the IHS is in a locked state. If the IHS is in the locked state, the controller: (i) disables a processor subsystem of the IHS from performing a start-up procedure until a unique password is received from a user interface coupled to the IHS; (ii) receives a user input from the user interface; (iii) determines whether the user input matches a unique password contained in an externally unreadable portion of memory of the IHS; (iv) in response to determining the received user input matches the unique password, permanently changes the lock data structure to an unlocked state and enables the processor subsystem to perform the start-up procedure.

An intended receiver of the IHS is supposed to have the unique passcode. The length of the passcode, the number of attempts allowed, timing limits required between attempts, etc., can be set to prevent a third party from trying every combination of codes until the correct one is happened upon. Attempts to disable the system shipping lock can be logged for a later investigation of thwarted attempts to access the IHS. In one or more embodiments, repeated unsuccessful attempts to input the passcode can result in a permanent lock that requires intervention by the OEM.

The present innovation enables an end user/recipient to be provided with the assurance that an IHS has been received without tampering. The system shipping lock prevents a third party from activating the IHS and making changes. Additionally, the innovation allows a device recipient to identify when such tampering has occurred before greater damage results, e.g., loss of network integrity or loss of data privacy. This shipment safeguard addresses a vulnerability that arises when neither sending nor receiving party have complete control over the IHS during transit. Thus, no trusted party can assure that the integrity of the IHS has been maintained. In one or more embodiments, an original equipment manufacturer (OEM) or distributor can ship an IHS to a recipient user at a datacenter. Both parties, namely, the user/recipient and OEM, have an interest in ensuring that no unscrupulous third parties have attempted to compromise the security of their datacenter by powering up the IHS and making changes to the code stored in the resources of the IHS. The controller of the IHS performs a method that mitigates such occurrences by implementing a system shipment lock (SSL) that is programmed with a special passcode. The passcode is forwarded in advance to the receiving customer. In one or more embodiments, all basic input/output system (BIOS) code and system management interfaces prompt for this passcode on system power up. The IHS requires this one-time system-specific and randomized passcode to 'unlock' the system. Without the passcode, the IHS can be considered unusable. The SSL will not allow any functions until the passcode is entered. Only the customer possessing the passcode will be able to perform this unlock, as a one-time operation. If the customer obtains the IHS and there is no passcode prompt, the customer can recognize that the IHS has been tampered with. In response, the customer can return the IHS or perform diagnostic measures before exposing a data center and sensitive data and operations to potentially malicious code or spyware.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
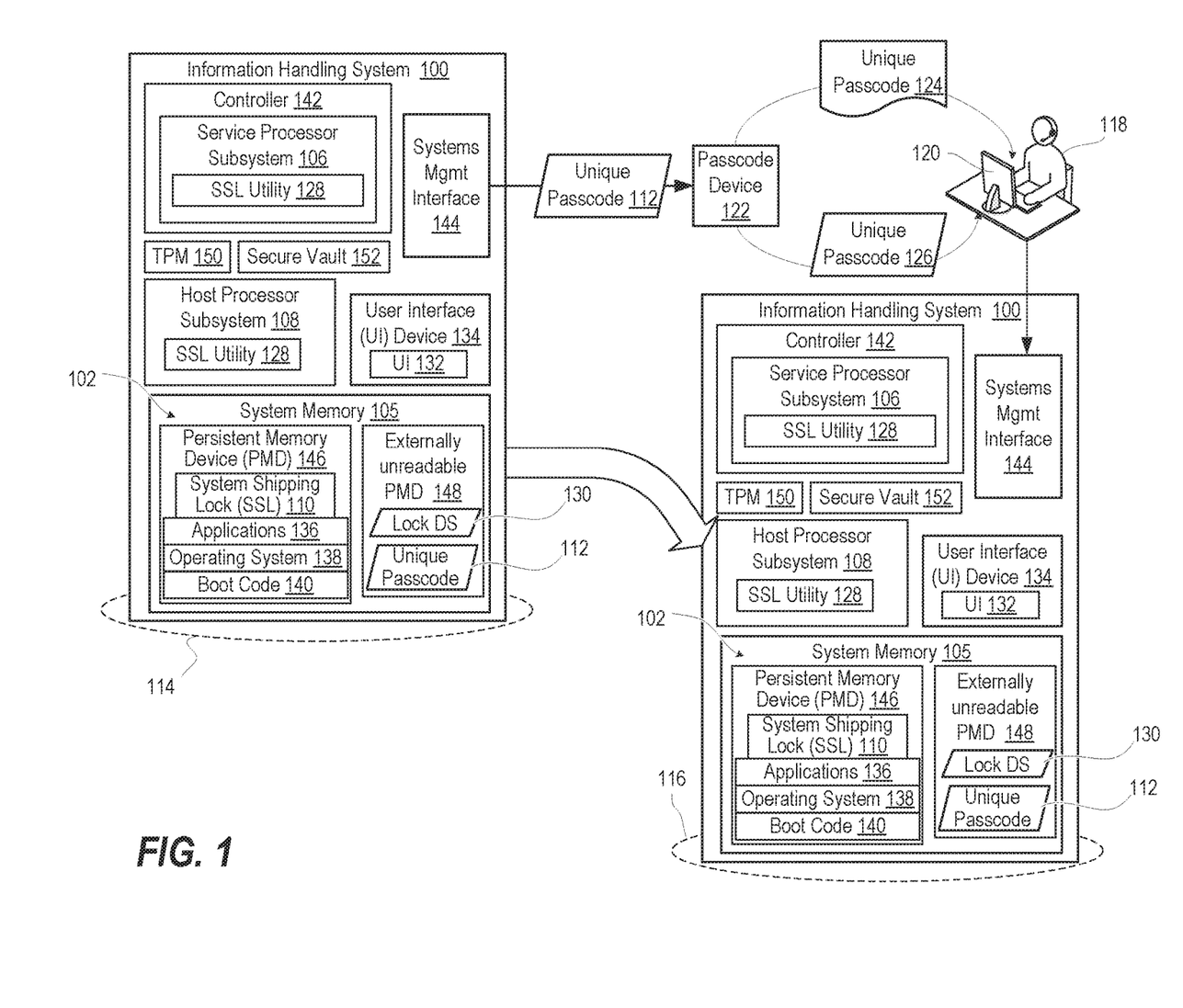
FIG. 1 illustrates a block diagram representation of an example information handling system (IHS) that supports a systems shipping lock to prevent or mitigate tampering during transit, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The information handling system (IHS) 100 includes locally-available information handling resource(s) 102, such as persistent memory devices 146 of system memory 105, that are required for operating processor subsystem(s). For clarity, FIG. 1 illustrates two processor subsystems, a service processor subsystem 106 and a host processor subsystem 108, both subject to an SSL 110 that electronically renders the IHS 100 inoperative beyond being able to receive a unique passcode 112 that permanently unlocks the IHS 100. For the purposes of this disclosure, information handling resources may broadly refer to any component system, device or apparatus of an IHS, including without limitation processors, service processors, basic input/output systems (BIOSs), buses, memories, I/O devices and/or interfaces, storage resources, network interfaces, motherboards, and/or any other components and/or elements of an IHS.

As an example scenario, FIG. 1 illustrates the IHS 100 as configured at an original equipment manufacturer (OEM) location 114 and then shipped to a customer location 116. An operator 118 or an operator console 120 at the customer location 116 can directly receive the unique passcode 112 and use the unique passcode 112 as part of setting up the IHS 100 for use. In one or more embodiments, a passcode device 122 can receive the unique passcode 112 before shipping of the IHS 100. In one or more embodiments, the passcode device 122 can either (i) separately ship a human-readable unique passcode 124 to the operator 118 or (ii) transmit a computer-readable unique passcode 126 to the operator console 120. Confirmation that the IHS 100 has the SSL 110 active at time of receipt of the IHS 100 provides assurance to the operator 118 or operator console 120 that certain types of tampering have not occurred during transit of the IHS 100.

In one or more embodiments, either one or both of the service and host processor subsystems 106, 108 execute a SSL utility 128 that determines whether a lock data structure (DS) 130 indicates an unlocked or a locked state of the one or more resources 102. In response to determining that the lock DS 130 indicates the locked state, the SSL utility 128 disables the processor subsystems 106, 108 of the IHS 100 from performing a start-up procedure until a unique password is received from a user interface (UI) 132 of a UI device 134. For example, in one or more embodiments, SSL 110 renders unusable one or more of operating system 138, boot code 140, at least a portion of system memory 105 containing applications 136, or other components of IHS 100.

In one or more embodiments, one of the processor subsystems 106, 108 can act as a controller (e.g., controller 142) that performs SSL functionality for the entire IHS 100. Controller 142 in addition can act as a systems management interface 144 for the IHS 100 at a baseboard level, chassis level, rack level, etc. In one or more embodiments, controller 142, via systems management interface 144, can receive the unique password 112 from a local UI device 134 or a remote operator console 120. Controller 142 can permanently unlock (directly or indirectly) all other system management interfaces that are subject to the SSL 110. Indirect unlocking can include passing the unique code to other processor subsystems such as host processor subsystem 108.

In one or more embodiments, in protecting persistent memory data contained in persistent memory devices (PMDs) 146, 148 such as FLASH memory devices, SSL 110 can include multiple electronic locks programmed into a number of devices. In one or more embodiments, a flexible system and method provides for different levels of protection. For example, SSLs can provide an ability to dynamically lock a sector of memory using a dynamic protection bit in volatile memory. SSLs can offer persistent locking of a sector using a non-volatile bit in memory and locking this status using a lock bit in volatile memory. SSL can offer yet further protection by including a password mode, which requires a password to clear the lock bit. The password can be located in an unreadable, one-time programmable area of the memory. The memory also includes areas for storing boot code in a protected manner. These areas have protection state that are controlled by an input signal.

In one or more exemplary embodiments, the system shipping lock 110 is in effect during the boot-up of the server host. Typically, when the server is powered on, the host will display the boot splash screen showing the server BIOS starting up. After the server BIOS boot stage, the next stage is the actual boot of the server operating system. In the case where the shipping lock has been activated, upon powering on the server, the host will immediately display the password prompt as the boot splash screen. At this point, only minimal server BIOS functionality will have been started to just display the prompt for the shipping lock password. Until the correct password has been entered, there will be no further server BIOS boot functionality, and of course, the boot stage of the server operating system will not occur. Basically, the total operation of the server is halted, waiting for the shipping lock password. It is possible to install mechanisms such that if there are five (5) consecutive password entry failures, the server stops displaying the shipping lock password prompt permanently, and from then on, the server will never display the prompt even with subsequent power-cycles. In other word, the server is placed in a quarantined mode indicating that possible unauthorized unlocking was attempted. A customer seeing this condition will be alerted that some form of unauthorized intrusion had been attempted. Similarly, if the customer encounters a system where the prompt for the shipping lock is not presented, and the customer has no knowledge that an authorized unlocking had taken place, the inevitable conclusion to draw is that the server may have experienced some form of unauthorized intrusion and that the server should be quarantined. For the case, where the correct shipping lock password is entered as an authorized action, the server will continue to boot in the normal fashion. The prompt for shipping lock password will no longer be presented in further boots of the server.

The IHS 100 can include software and hardware components that secure encryption keys and provide secure access to certain portions of memory, such as an externally unreadable PMD 148. In one or more embodiments, the IHS 100 includes a trusted platform module (TPM) 150 and a secure vault 152 that is dedicated to holding encryption keys and other sensitive data that is not to be accessible remote to the IHS 100. Software can use TPM 150 to authenticate hardware devices. Since each TPM chip has a unique and secret RSA key burned in as the TPM 150 is produced, TPM 150 is capable of performing platform authentication. Generally, pushing the security down to the hardware level in conjunction with software provides more protection than a software-only solution. Key(s) used in TPM 150 are not accessible on a bus or to external programs and all encryption/decryption is done in TPM 150 to avoid disseminating the key(s) by other software elements.

Figure 2:
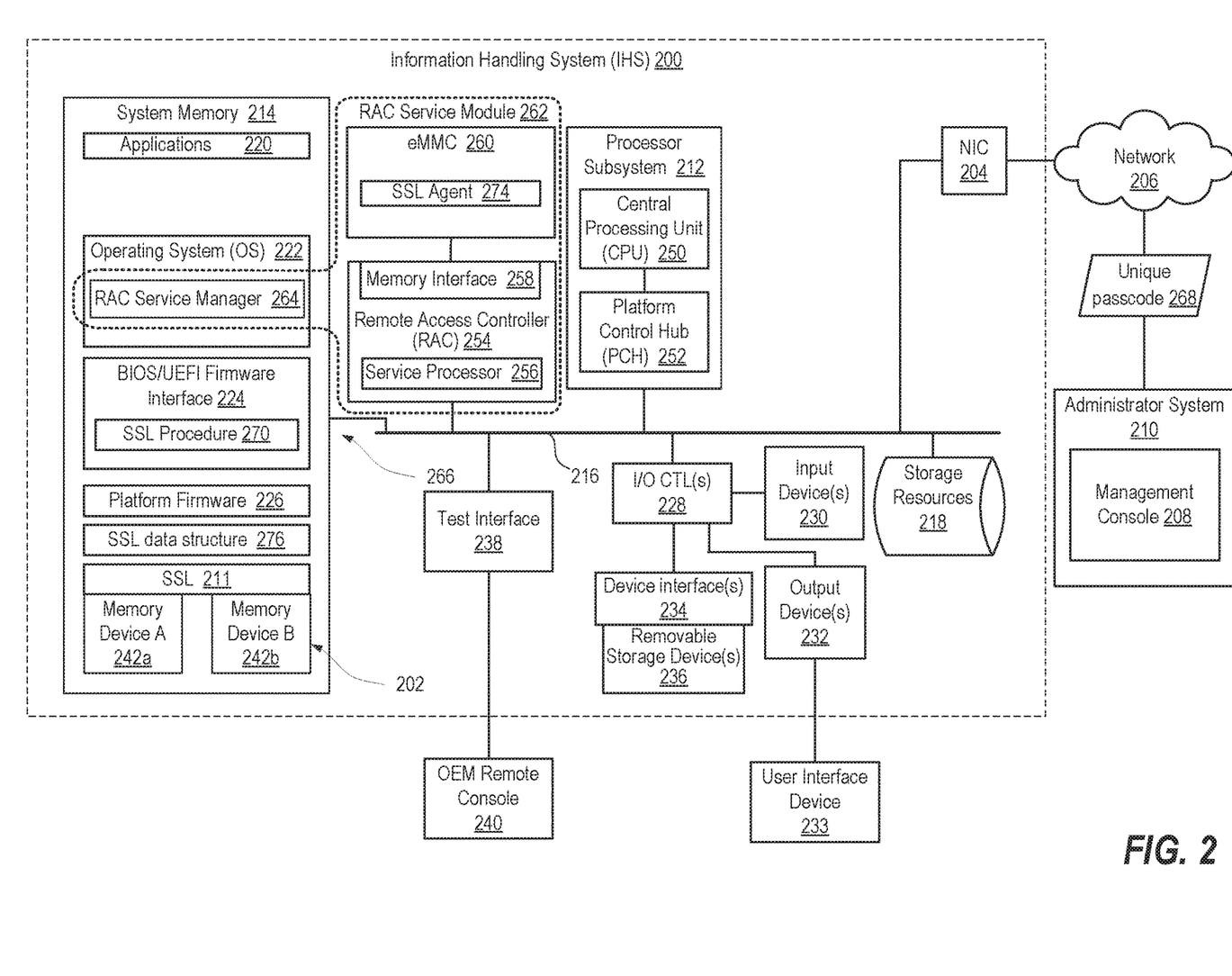
FIG. 2 illustrates a block diagram representation of an example IHS having information handling resources that are locked during transit, according to one or more embodiments.

FIG. 2 illustrates a block diagram representation of an example IHS 200 having information handling resources 202 whose integrity is maintained by requiring unlocking of the IHS after transit. IHS 200 includes a network interface, depicted as a network interface controller (NIC) 204, in communication via a network 206 with a management console 208 of an administrator system 210. Prior to shipment of the IHS 200 to a customer destination, system shipment lock(s) 211 are electronically installed to prevent functional operation of one or more information handling resources 202 that are necessary for activation of respective processors of the IHS 200. In particular, SSLs 211 prevent operation of IHS 200. A host processor subsystem 212 is coupled to system memory 214 via system interconnect 216. System interconnect 216 can be interchangeably referred to as a system bus, in one or more embodiments. System interconnect 216 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 216 can also be a Double Data Rate (DDR) memory interface. The system memory 214 can either be contained on separate removable dual inline memory module (RDIMM) devices or system memory 214 can be contained within persistent memory devices (NVDIMMs). For example, the NVDIMM-N variety of NVDIMMs contain both random access memory, which can serve as system memory, and non-volatile memory. It should be noted that other channels of communication can be contained within system interconnect 216, including but not limited to i2c or system management bus (SMBus). System interconnect 216 communicatively couples various system components including, for example, replaceable local storage resources 218 such as solid state drives (SDDs) and hard disk drives (HDDs) within which can be stored one or more software and/or firmware modules and one or more sets of data that can be utilized during operations of IHS 200. Specifically, in one embodiment, system memory 214 can include therein a plurality of such modules, including one or more of application(s) 220, operating system (OS) 222, a firmware interface 224 such as basic input/output system (BIOS) or Uniform Extensible Firmware Interface (UEFI), and platform firmware (FW) 226. These software and/or firmware modules have varying functionality when their corresponding program code is executed by host processor subsystem 212 or secondary processing devices within IHS 200. For example, application(s) 220 may include a word processing application, a presentation application, and a management station application, among other applications.

IHS 200 further includes one or more input/output (I/O) controllers 228 that support connection by and processing of signals from one or more connected input device/s 230, such as a keyboard, mouse, touch screen, or microphone. I/O controllers 228 also support connection to and forwarding of output signals to one or more connected output devices 232, such as a monitor or display device or audio speaker(s). In one or more embodiments, a user interface device 233 provides both input and output functionality. Additionally, in one or more embodiments, one or more device interfaces 234, such as an optical reader, a universal serial bus (USB), a card reader, Personal Computer Memory Card International Association (PCMCIA) slot, and/or a high-definition multimedia interface (HDMI), can be associated with IHS 200. Device interface(s) 234 can be utilized to enable data to be read from or stored to corresponding removable storage device/s 236, such as a compact disk (CD), digital video disk (DVD), flash drive, or flash memory card. In one or more embodiments, device interface(s) 234 can further include general purpose I/O interfaces such as inter-integrated circuit ($I^2C$), system management bus (SMB), and peripheral component interconnect (PCI) buses. One or more device interface(s) 234 can support removable storage devices (RSDs) 236. Certain interfaces can be available during manufacture, configuration, and testing. These interfaces are depicted as test interface 238. In one or more embodiments, an original equipment manufacturer (OEM) or other authorized party can interact with the functional components of the IHS 200 via an OEM remote console 240 coupled to the test interface 238. Memory device A 242a and memory device B 242b represent portions of system memory 214 that can be configured or programmed via the OEM remote console 240.

NIC 204 enables IHS 200 and/or components within IHS 200 to communicate and/or interface with other devices, services, and components that are located external to IHS 200. These other devices, services and/or components are represented as network devices such as administrator system 210. These devices, services, and components can interface with IHS 200 via an external network, such as example network 206, using one or more communication protocols that include transport control protocol (TCP/IP) and network block device (NBD) protocol. Network 206 can be a local area network, wide area network, personal area network, and the like, and the connection to and/or between network and IHS 200 can be wired, wireless, or a combination thereof. For purposes of discussion, network 206 is indicated as a single collective component for simplicity. However, it should be appreciated that network 206 can comprise one or more direct connections to other devices as well as a more complex set of interconnections as can exist within a local area network or a wide area network, such as the Internet.

Host processor subsystem 212 can include a central processing unit (CPU) 250 that is augmented by a platform control hub (PCH) 252. The PCH 252 interfaces to functional components of the IHS 200 such as a baseboard management controller (BMC), depicted as a remote access controller (RAC) 254. In one or more embodiments, a specialized service processor 256 of the RAC 254 performs BMC functionality. For example, the RAC 254 monitors the physical state of a computer, network server or other hardware device, such as information handling resources 202 202, using sensors. RAC 254 communicates with an administrator system 210 through an independent connection, such as NIC 204. As a non-limiting example, RAC 254 can be an improved integrated Dell Remote Access Controller (iDRAC) from Dell® that supports the additional multipath functionality described herein. The iDRAC has the ability to edit/create files locally to itself. The iDRAC also has the ability to see OS specific files. RAC 254 performs out-of-band communication for the IHS 200 via the NIC 204 and network 206 to a network device, such as a management console 208 on administrator system 210. RAC 254 can have access, via a memory interface (I/F) 258, to a persistent storage device, such as an embedded multimedia card (eMMC) 260. The eMMC 260 is a flash memory and controller packaged into a small ball grid array (BGA) integrated circuit (IC) package for use in circuit boards as an embedded non-volatile memory system. The eMMC 260 is separate from the system memory 214. RAC 254 is part of a RAC service module 262 having a RAC service manager 264 resident in system memory 214 and executed by the host processor subsystem 212. RAC service manager 264 provides a runtime interface between RAC 254 and system memory 214.

In one or more embodiments, RAC service module 262 solely performs all of operations of SSL, functioning as controller 266 for the entire IHS 200. In one or more embodiments, RAC 262 acts as controller 266 by performing a portion of the operations of SSL with distributed processing by host processor subsystem 212. The controller 266 is coupled to an interface by which controller 266 is able to communicate with a passcode device. In one or more embodiments, the test interface 238 and OEM remote console 240 provide this capability of a passcode device. In one or more embodiments, the NIC 204 and management console 208 provide this capability. In one or more embodiments, I/O controllers 228 and user interface device 233 provide this capability. These three capabilities are exemplary. Other embodiments can provide another type of communication channel that serves to convey a unique passcode 268 separately from on-board memory storage provided on the IHS 200. To permanently unlock the IHS 200, the unique passcode 268 is entered into the IHS 200, such as via the user interface device 233 or management console 208. In one or more embodiments, the host processor subsystem 212 can execute a SSL procedure 270 stored in the firmware interface 224. During start-up of the host processor subsystem 212, the SSL procedure 270 limits the IHS 200 to provide only functionality of receiving and confirming the unique passcode 268 before resuming start-up.

In one or more embodiments, RAC 254 can include an SSL agent 274 that is executed by the service processor 256 to access lock data structure(s) 276 stored in system memory 214 or storage resources 218. In one or more embodiments, RAC 254 can perform out-of-band communications while the rest of the IHS 200 is inactive. For example, RAC 254 can be used to shutdown and restart portions of the IHS 200 that are not needed to handle a current workload. In addition, RAC 254 can perform passcode verification and permanent unlocking of the IHS 200.

Figure 3:
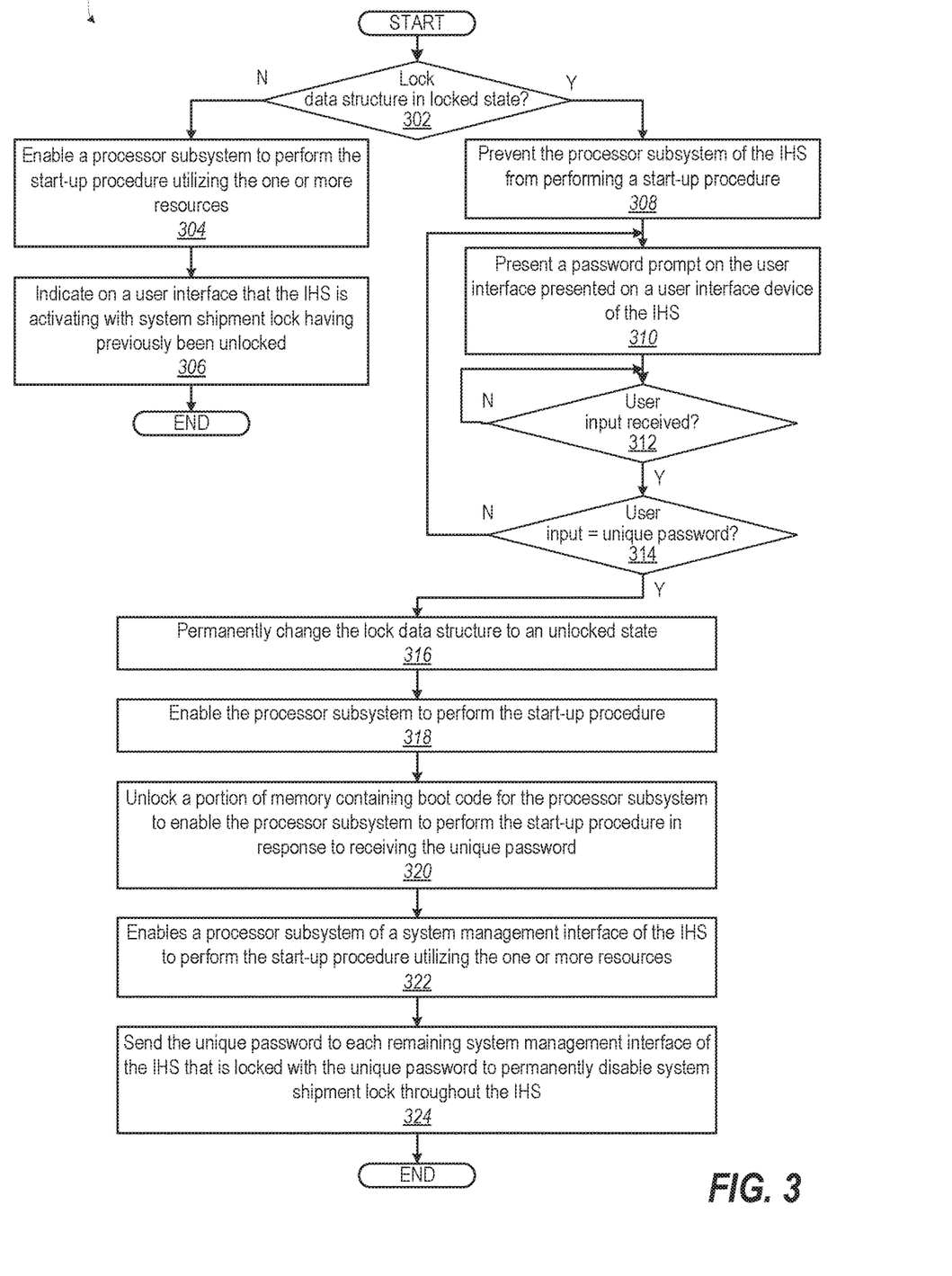
FIG. 3 illustrates a method of providing a systems shipment lock of information handling resources of an IHS to prevent or mitigate tampering with the IHS prior to the resources being used by an intended end user, according to one or more embodiments.
Figure 4:
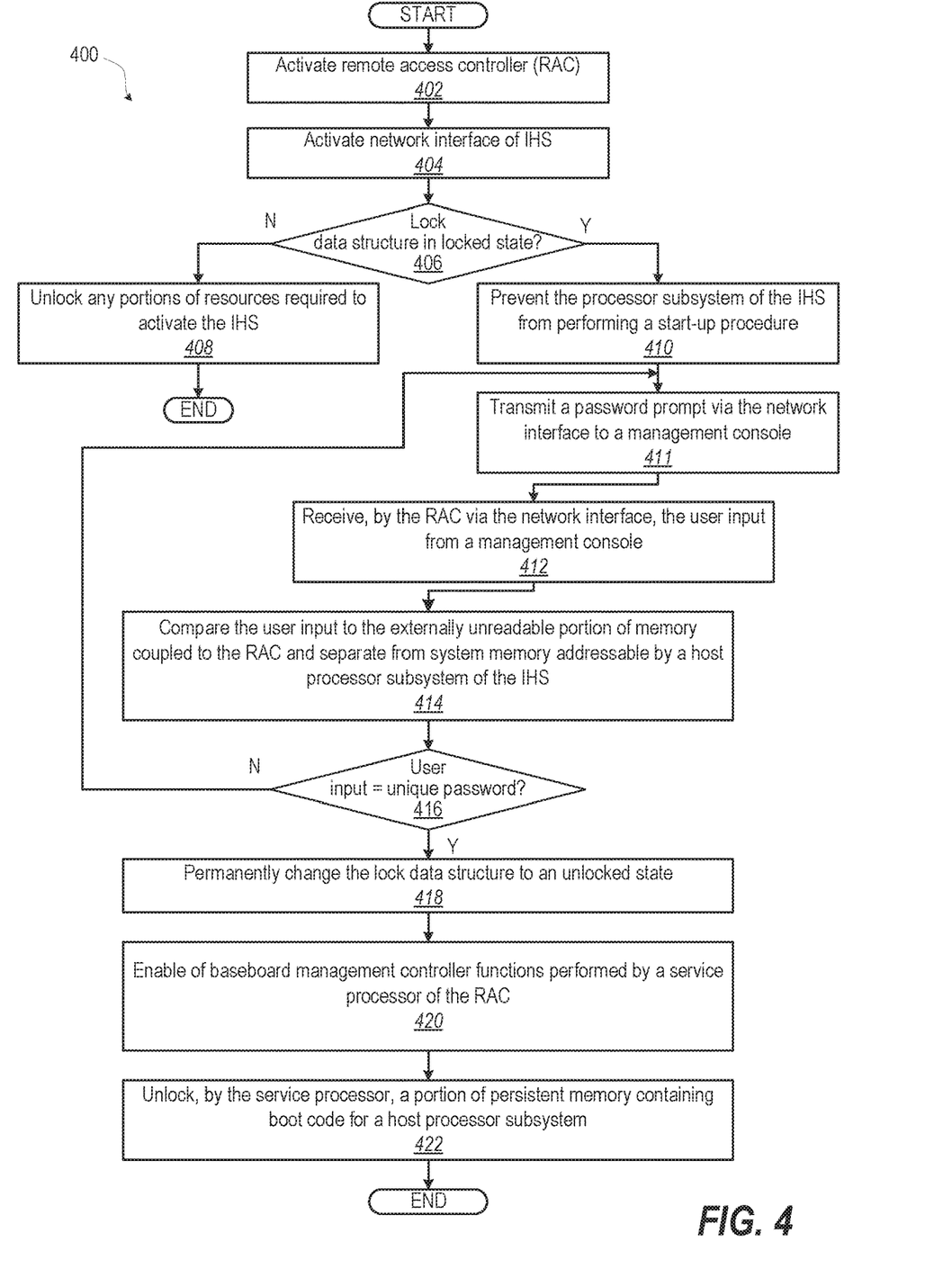
FIG. 4 illustrates a flow diagram representation of a method of providing a systems shipment lock via a remote access controller (RAC) of an IHS, according to one or more embodiments.

FIGS. 3-4B illustrate flowcharts of exemplary methods 300, 400 by which controller 142 (FIG. 1) and/or controller 266 (FIG. 2) performs different aspects of the processes that enable the one or more embodiments of the disclosure.

Generally, methods 300, 400 represent computer-implemented methods. The description of methods 300, 400 are provided with general reference to the specific components illustrated within FIGS. 1-2.

FIG. 3 illustrates a method of preventing unauthorized third-party access to an IHS. In one or more embodiments, method 300 begins by determining whether a lock data structure in a persistent memory device indicates an unlocked or a locked state of one or more resources of an IHS (decision block 302). In response to determining that the lock data structure indicates the unlocked state, a controller enables a processor subsystem to perform the start-up procedure utilizing the one or more resources (block 304). For example, after an IHS is successfully activated with the passcode at a customer facility, the IHS can be deactivated and reactivated for workload purposes or for movement within the facility. Since the customer remains in control of the IHS, a need does not exist to implement a shipping lock. The system shipment lock has served a purpose of assuring successful shipment between two parties without unauthorized access during or shortly after transit. Method 300 includes indicating on a user interface that the IHS is activating with system shipment lock having previously been unlocked (block 306). Then method 300 ends. In response to determining that the lock data structure indicates the locked state in decision block 302, the controller prevents the processor subsystem of the IHS from performing a start-up/boot-up procedure (block 308). Method 300 includes presenting a password prompt on a user interface (presented on a user interface device) of the IHS (block 310). A determination is made by the controller as to whether a user input is received from the user interface device (decision block 312). In response to determining that the user input is not received, IHS remains disabled and method 300 returns to block 312 to continue waiting for the user input. IHS remains disabled until the unique password is received from the user interface coupled to the IHS. In response to determining that the user input is received, method 300 includes determining whether the user input matches a unique password contained in an externally unreadable portion of memory of the IHS (decision block 314). In response to determining that the user input does not match the unique password, method 300 returns to block 310 to prompt for another user input. In one or more embodiments, the method 300 will allow endless attempts with no time delay required between attempts. If the authorized customer were to receive an unlocked IHS, the customer would have reason to suspect tampering. In one or more embodiments, the unlocking protocol could require a period of time to elapse between attempts. In one or more embodiments, the unlocking protocol could have a maximum number of attempts before the lockout becomes unresponsive to the unique password, requiring a more comprehensive intervention to activate the IHS. In response to determining that the user input matches the unique password, the controller permanently changes the lock data structure to an unlocked state (block 316). The controller enables the processor subsystem to perform the start-up procedure (block 318).

In one or more embodiments, method 300 includes unlocking a portion of memory containing boot code for the processor subsystem to enable the processor subsystem to perform the start-up procedure in response to receiving the unique password (block 320). In one or more embodiments, the controller enables a processor subsystem of a system management interface of the IHS to perform the start-up procedure utilizing the one or more resources (block 322). The controller sends the unique password to each remaining system management interface of the IHS that is locked with the unique password to permanently disable system shipment lock throughout the IHS (block 324).

FIG. 4 illustrates an example method of preventing unauthorized third-party access to an IHS between the time the IHS leaves an OEM and the time the IHS is received by an end customer. In one or more embodiments, method 400 begins with activating a remote access controller (RAC) of the IHS (block 402). RAC activates a network interface of the IHS (block 404). Method 400 includes the RAC determining whether a lock data structure in a persistent memory device indicates an unlocked or a locked state of one or more resources of an IHS (decision block 406). In response to determining that the lock data structure indicates the unlocked state, method 400 includes unlocking any portions of resources required to activate the IHS (block 408). Then method 400 ends.

In one or more embodiments, unlocking the IHS can be one step in a commissioning procedure for making end user configuration changes. In addition to thwarting malicious tampering, the lock prevents innocent but unauthorized activation of the IHS so that a formal procedure can be employed to receive an IHS in a known, unaltered condition. One or more of these steps can be automated, such as input the various network setting and addresses for utilizing the IHS within a datacenter. A network administrator can cause a commissioning script or program to execute that checks to see that the IHS is received in a locked state. If the IHS is unlocked, the script or program can cause an alert notification to be triggered, prompting further remedial steps.

In response to determining in decision block 406 that the lock data structure indicates the locked state, controller prevents a host processor subsystem from performing a start-up procedure (block 410). In the illustrative embodiment, method 400 includes transmitting a password prompt via the network interface to a management console (block 411). RAC receives, via the network interface, the user input from a management console (block 412). In response to receiving a user input from the user interface, RAC compares the user input to a password data stored in the externally unreadable portion of memory coupled to the RAC (block 414). The externally unreadable memory is separate from system memory, which is addressable by a host processor subsystem of the HIS. Method 400 includes determining whether the user input matches a unique password contained in the externally unreadable portion of memory of the IHS (decision block 416). In response to determining that the user input does not match the unique password, method 400 returns to block 411 to wait for another user input. In response to determining that the user input matches the unique password, RAC permanently changes the lock data structure to an unlocked state (block 418). In one or more embodiments, method 400 includes enabling of baseboard management controller functions performed by a service processor of the RAC (block 420). In one or more embodiments, method 400 includes unlocking, by the service processor, a portion of persistent memory containing boot code for a host processor subsystem (block 422). The unlocking of boot code enables the device to activate the boot-up procedure of the IHS.

In the above described flow charts of FIG. 3-4, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of preventing unauthorized third-party access to an information handling system (IHS), the method comprising:

determining, during a start-up procedure, before actual boot of the operating system, whether a lock data structure in a persistent memory device indicates a locked state of one or more resources of an IHS, the lock data structure providing a value indicating one of a locked or an unlocked state of the IHS and associated with a system shipping lock (SSL) that protects the IHS during shipping by providing a password mode, which requires entry of an unlock passcode to clear a lock bit of the lock data structure, wherein entry of the unlock passcode is required to access each of at least one locked resource of the IHS, and the SSL and lock data structure prevents un-authorized activation of the IHS and/or changes to or tampering with the IHS during shipping, wherein the lock data structure is a separate memory data from the unlock passcode; and in response to determining that the lock data structure indicates the locked state is activated for the IHS:

preventing a processor subsystem of the IHS from proceeding with the start-up procedure until a unique password, which is the unlock passcode, is received, wherein a processor of the device is prevented from booting up an Operating System (OS) when the device is in the locked state;

in response to powering up of the IHS while the shipping lock is activated, displaying a password prompt as a boot splash screen, the password prompt prompting for entry of the unlock passcode to clear the lock bit of the lock data structure and change the lock state of the lock data structure to the unlocked state, the prompting being presented as the boot splash screen and completed via one of a basic input/output (BIOS) code and system management interface on system power up before execution of the operating system;

in response to receiving an input, determining whether the input matches a unique password contained in an externally unreadable portion of persistent memory of the IHS; and in response to determining that the input matches the unique password:

permanently changing the lock data structure to the unlocked state;

enabling the processor subsystem to perform the start-up procedure; and performing indirect unlocking of all other system management interfaces that are subject to the SSL, wherein performing the indirect unlocking comprises sending the unique password to each remaining system management interface of the IHS that is locked with the unique password to permanently disable system shipment lock throughout the IHS.

2. The method of claim 1, further comprising:

in response to a power on procedure being triggered by a local input, presenting a password prompt on the user interface device of the IHS;

receiving the input from a user interface device; and unlocking a portion of memory containing boot code for the processor subsystem to enable the processor subsystem to perform the start-up procedure in response to receiving the unique password as the input.

3. The method of claim 1, further comprising:

in response to activation of a remote access controller (RAC), activating a network interface of the IHS;

transmitting a password prompt via the network interface to a management console;

receiving, by the RAC, an input from a management console that is communicatively connected to the RAC via the network interface; and comparing the input to the unique password contained in the externally unreadable portion of memory coupled to the RAC, the externally unreadable portion of memory being separate from system memory that is addressable by a host processor subsystem of the IHS.

4. The method of claim 3, further comprising:

in response to the RAC determining that the input matches the unique password:

enabling of baseboard management controller functions performed by a service processor of the RAC; and unlocking, by the service processor, a portion of persistent memory containing boot code for a host processor subsystem.

5. The method of claim 1, further comprising:

in response to determining that the lock data structure indicates the unlocked state, enabling the processor subsystem to perform the start-up procedure utilizing the one or more resources;

indicating on the user interface that the IHS is activating with system shipment lock having previously been unlocked; and generating an alert notification that the lock data structure is no longer in a locked state, the alert notification being shareable during a subsequent boot of the IHS.

6. The method of claim 1, wherein performing the indirect unlocking further comprises:

passing, via the controller, the unique password to other processor subsystems; and enabling the processor subsystem of a system management interface of the IHS to perform the start-up procedure utilizing the one or more resources.

7. The method of claim 1, further comprising:

tracking a number of consecutive password entry failures;

detecting when the number of failures equals or exceeds a preset number of unauthorized unlock attempts; and in response to the number of failures reaching the preset number: permanently stopping a displaying of the password prompt with subsequent power-cycles; and placing the server in a quarantined mode indicating that possible unauthorized unlocking was attempted, wherein a customer is alerted that some unauthorized intrusion has been attempted.

8. The method of claim 1, further comprising:

providing, via the SSL, different levels of protection, wherein multiple electronic locks are programmed into a number of devices to protect persistent memory data contained in persistent memory devices, the programming of the multiple electronic locks comprising one or more of:

dynamically locking a sector of memory using a dynamic protection bit in volatile memory;

persistently locking a sector using a non-volatile bit in memory and locking a status using a lock bit in volatile memory;

enabling the password mode, which requires a password to clear the lock bit, the password being located in an unreadable, one-time programmable area of the memory; and providing one or more areas of memory for storing boot code in a protected manner, the areas of memory having a protection state that are controlled by an input signal; and wherein the multiple electronic locks by the SSL renders unusable one or more of the operating system, boot code, at least a portion of system memory containing applications, and other components of the IHS, wherein no further server BIOS boot functionality occurs and a boot stage of the OS does not occur when the correct unique password is not received as the input to the prompting during startup.

9. A controller comprising:

an interface in communication with an input device;
a persistent memory; and
a processor subsystem of an information handling system (IHS) and which is in communication with the persistent memory device to execute a system shipment lock (SSL) utility and which:
  determines, during a start-up procedure, before boot of the operating system, whether a lock data structure in the persistent memory indicates one or more resources of an information handling system (IHS) are in a locked state, the lock data structure providing a value indicating one of a locked or an unlocked state of the IHS and associated with a system shipping lock (SSL) that protects the IHS during shipping by providing a password mode, which requires entry of an unlock passcode to clear a lock bit of the lock data structure, wherein entry of the unlock passcode is required to access each of at least one locked resource of the IHS, and the SSL and lock data structure prevents un-authorized activation of the IHS and/or changes to or tampering with the IHS during shipping, wherein the lock data structure is a separate memory data from the unlock passcode; and
  in response to determining that the lock data structure indicates the locked state is activated for the IHS:
    prevents the processor subsystem of the IHS from proceeding with the start-up procedure until a unique password, which is the unlock passcode, is received from the user interface, wherein a processor of the device is prevented from booting up an Operating System (OS) when the device is in the locked state;
    in response to powering up of the IHS while the shipping lock is activated, displaying a password prompt as a boot splash screen, where the password prompt prompts for entry of the unlock passcode to clear the lock bit of the lock data structure and change the lock state of the lock data structure to the unlocked state, the prompting being presented as the boot splash screen and completed via one of a basic input/output (BIOS) code and system management interface on system power up before execution of the operating system;
    in response to receiving an input, determines whether the input matches a unique password contained in an externally unreadable portion of memory of the IHS; and
    in response to determining that the input matches the unique password:
      permanently changes the lock data structure to an unlocked state;
      enables the processor subsystem to perform the start-up procedure; and
      in response to determining that the lock data structure indicates the unlocked state, indirectly unlocks all other system management interfaces that are subject to the SSL, wherein to perform the indirect unlocking, the controller sends the unique password to each remaining system management interface of the IHS that is locked with the unique password to disable system shipment lock throughout the IHS.

10. The controller of claim 9, wherein:
the input device comprises a user input device;
the SSL utility causes the processor subsystem to:
  present a password prompt on the user interface presented on a user interface device of the IHS;
  receive the input from a user interface device; and
  unlock a portion of memory containing boot code for the processor subsystem to enable the processor subsystem to perform the start-up procedure in response to receiving the unique password.

11. The controller of claim 9, wherein:
the processor subsystem comprises a service processor that executes the SSL utility and a remote access controller (RAC) that provide the functionality of the system management interface via a network interface with a management console that presents the user interface;
the SSL utility compares the input to the unique password contained in the externally unreadable portion of memory coupled to the RAC that is separate from system memory addressable by a host processor subsystem of the HIS; and
in response to the RAC determining that the input matches the unique password, the SSL utility:
  enables system management interface functions performed by a service processor of the RAC; and
  unlocks, by the service processor, a portion of persistent memory containing boot code for a host processor subsystem.

12. The controller of claim 9, wherein:
in response to determining that the lock data structure indicates the unlocked state, the SSL utility:
  enables the processor subsystem to perform the start-up procedure utilizing the one or more resources; and
  indicates on the user interface that the IHS is activating with system shipment lock having previously been unlocked; and
  generates an alert notification that the lock data structure is no longer in a locked state, the alert notification being shareable during a subsequent boot of the HIS.

13. The controller of claim 9, wherein to perform the indirect unlocking, the controller further:
passes the unique password to other processor subsystems; and
enables the processor subsystem of a system management interface of the IHS to perform the start-up procedure utilizing the one or more resources.

14. The controller of claim 9, wherein the SSL utility causes the controller to:
track a number of consecutive password entry failures;
detect when the number of failures equals or exceeds a preset number of unauthorized unlock attempts; and
in response to the number of failures reaching the preset number: permanently stop a displaying of the password prompt with subsequent power-cycles; and place the server in a quarantined mode indicating that possible unauthorized unlocking was attempted, wherein a customer is alerted that some unauthorized intrusion has been attempted.

15. An information handling system (IHS) comprising:
one of more locally-available information handling resources;
an interface in communication with an input device;
a persistent memory; and
a processor subsystem in communication with the persistent memory device to execute a system shipment lock (SSL) utility and which:
   determines, during an initial start-up procedure of the IHS, before boot of the operating system, whether a lock data structure in the persistent memory indicates one or more resources are in a locked state, the lock data structure providing a value indicating one of a locked or an unlocked state of the IHS and associated with a system shipping lock (SSL) that protects the IHS during shipping by providing a password mode, which requires entry of an unlock passcode to clear a lock bit of the lock data structure, wherein entry of the unlock passcode is required to access each of at least one locked resource of the IHS, and the SSL and lock data structure prevents un-authorized activation of the IHS and/or changes to or tampering with the IHS during shipping, wherein the lock data structure is a separate memory data from the unlock passcode; and
   in response to determining that the lock data structure indicates the locked state is activated for the IHS:
      prevents the processor subsystem of the IHS from proceeding with the start-up procedure until a unique password, which is the unlock passcode, is received from the user interface, wherein a processor of the device is prevented from booting up an Operating System (OS) when the device is in the locked state;
      in response to powering up of the IHS while the shipping lock is activated, displaying a password prompt as a boot splash screen, where the password prompt prompts for entry of the unlock passcode to clear the lock bit of the lock data structure and change the lock state of the lock data structure to the unlocked state, the prompting being presented as the boot splash screen and completed via one of a basic input/output (BIOS) code and system management interface on system power up before execution of the operating system;
      in response to receiving an input, determines whether the input matches a unique password contained in an externally unreadable portion of memory of the IHS; and
      in response to determining that the input matches the unique password:
         permanently changes the lock data structure to an unlocked state;
         enables the processor subsystem to perform the start-up procedure; and
         in response to determining that the lock data structure indicates the unlocked state, the SSL utility configures a controller to indirectly and permanently unlock all other system management interfaces that are subject to the SSL, wherein to perform the indirect unlocking, the controller sends the unique password to each remaining system management interface of the IHS that is locked with the unique password to disable system shipment lock throughout the IHSs.

16. The IHS of claim 15, wherein the SSL utility causes the processor sub system to:
   present a password prompt on the user interface presented on a user interface device of the IHS;
   receive the input from the user interface device; and
   unlock a portion of memory containing boot code for the processor subsystem to enable the processor subsystem to perform the start-up procedure in response to receiving the unique password.

17. The IHS of claim 15, wherein:
the processor subsystem comprises a service processor that executes the SSL utility and a remote access controller (RAC) that provide the functionality of the system management interface via a network interface with a management console that presents the user interface;
the SSL utility compares the input to the unique password contained in the externally unreadable portion of memory coupled to the RAC that is separate from system memory addressable by a host processor subsystem of the HIS; and
in response to the RAC determining that the input matches the unique password, the SSL utility:
   enables system management interface functions performed by a service processor of the RAC; and
   unlocks, by the service processor, a portion of persistent memory containing boot code for a host processor subsystem.

18. The IHS of claim 15, wherein:
in response to determining that the lock data structure indicates the unlocked state, the SSL utility:
   enables the processor subsystem to perform the start-up procedure utilizing the one or more resources;
   indicates on the user interface that the IHS is activating with system shipment lock having previously been unlocked; and
   generates an alert notification that the lock data structure is no longer in a locked state, the alert notification being shareable during a subsequent boot of the IHS.

19. The IHS of claim 15,
wherein to perform the indirect unlocking, the controller:
   passes the unique password to other processor subsystems; and
   enables the processor subsystem of a system management interface of the IHS to perform the start-up procedure utilizing the one or more resources.

20. The IHS of claim 15, wherein the SSL utility further:
tracks a number of consecutive password entry failures;
detects when the number of failures equals or exceeds a preset number of unauthorized unlock attempts; and
in response to the number of failures reaching the preset number: permanently stops a displaying of the password prompt with subsequent power-cycles; and places the server in a quarantined mode indicating that possible unauthorized unlocking was attempted, wherein a customer is alerted that some unauthorized intrusion has been attempted.

* * * * *